United States Patent
Venkatraman et al.

(10) Patent No.: US 6,304,897 B1
(45) Date of Patent: Oct. 16, 2001

(54) METHOD OF PROCESSING AN E-MAIL MESSAGE THAT INCLUDES A REPRESENTATION OF AN ENVELOPE

(75) Inventors: Rajamadam C. Venkatraman, San Jose; Vincent Min-Hao Chern, Santa Clara; Sekaran Nanja, San Jose; Haresh Gujarathi, Sunnyvale, all of CA (US)

(73) Assignee: PostX Corporation, Cupertino, CA (US)

(*) Notice: Subject to any disclaimer, the term of this patent is extended or adjusted under 35 U.S.C. 154(b) by 0 days.

(21) Appl. No.: 09/433,033

(22) Filed: Nov. 1, 1999

Related U.S. Application Data

(62) Division of application No. 08/845,722, filed on Apr. 25, 1997, now Pat. No. 6,014,688.

(51) Int. Cl.[7] ................................................. G06F 15/16
(52) U.S. Cl. ........................ 709/206; 709/217; 709/218; 709/219
(58) Field of Search .................................. 709/206, 217, 709/218, 219

(56) References Cited

U.S. PATENT DOCUMENTS

| | | |
|---|---|---|
| D. 11,138 | 4/1879 | Bainbridge . |
| D. 58,535 | 8/1921 | Balogh . |
| D. 90,730 | 9/1933 | Reinhold . |

(List continued on next page.)

FOREIGN PATENT DOCUMENTS

| | | |
|---|---|---|
| 0 371607 A2 | 6/1990 | (EP) . |
| 0 674408 A2 | 9/1995 | (EP) . |

OTHER PUBLICATIONS

Jeff Beckley et al., Eudora Light: Version 3.0 For Windows User Manuel, Qualcomm Inc., pp. 14–16, 101–102, Feb. 1997.*

Ken Moore, et al., RFC 1894, "An Extensible Message Format for Delivery Status Notification," Jan. 1996, Network Working Group, pp. 1–5.

Author Unknown, Return Recipt.com homepage, http://www.returnreceipt.com/, Jan. 1998, 6 pages.

Hui, S.C., et al., "A Multimedia Electronic Mail System on a Heterogenous Environment", TENCON '93, 1993, IEEE Region 10 Conference, Oct. 1993, vol. 1, pp. 61–64.

"Real Mail User Interface for In–Basket", IBM Technical Disclosure Bulletin, vol. 31, No. 10, Mar. 1989.

Ming Ouhyoung, et al. "The MOS Multimedia E–Mail System", Proceedings of the International Conference on Multimedia Computing and Systems (Cat. No. 94TY0631–2), Proceedings of IEEE Intn'l Conf. On Multimedia Computing and Systems, Boston, MA, May 15–19, 1994.

*Primary Examiner*—Patrice Winder
(74) *Attorney, Agent, or Firm*—Pillsbury Winthrop LLP

(57) ABSTRACT

The present invention is directed towards a method of processing an e-mail message that includes a representation of an envelope. The electronic envelope includes a time stamp, sender identity identification and/or other objects that are displayed on a computer screen of the user. Upon initiation of a user action when a cursor is positioned at a screen location corresponding to the time stamp or sender identity identification, this action causes the computer to connect to a location associated with the time stamp or the sender identity identification.

31 Claims, 21 Drawing Sheets

U.S. PATENT DOCUMENTS

| | | |
|---|---|---|
| D. 99,171 | 3/1936 | Thompson . |
| D. 111,285 | 9/1938 | Jackson . |
| D. 128,437 | 7/1941 | Moskowitz . |
| D. 128,679 | 8/1941 | Perkins . |
| D. 168,615 | 1/1953 | Hyman . |
| D. 230,772 | 3/1974 | Yong ................................... D59/8 |
| D. 268,117 | 3/1983 | Solomon ............................. D19/3 |
| D. 275,688 | 9/1984 | Tsai ..................................... D19/4 |
| D. 295,630 | 5/1988 | Wells-Papanek et al. ........... D18/27 |
| D. 295,631 | 5/1988 | Wells-Papanek et al. ........... D18/29 |
| D. 295,632 | 5/1988 | Wells-Papanek et al. ........... D18/27 |
| D. 295,633 | 5/1988 | Wells-Papanek et al. ........... D18/27 |
| D. 296,339 | 6/1988 | Wells-Papanek et al. ........... D18/27 |
| D. 297,243 | 8/1988 | Wells-Papanek et al. ........... D18/27 |
| D. 298,144 | 10/1988 | Wells-Papanek et al. ........... D18/27 |
| D. 310,385 | 9/1990 | Thomson ............................. D19/3 |
| D. 322,810 | 12/1991 | Bak ..................................... D19/3 |
| D. 335,303 | 5/1993 | Reeves ................................. D19/4 |
| 3,848,356 | 11/1974 | Wylie et al. ............................ 46/11 |
| 4,613,907 | 9/1986 | Yoshimoto et al. ................. 358/257 |
| 5,057,935 | 10/1991 | Williams ............................. 358/402 |
| 5,283,856 | 2/1994 | Gross et al. .................... 709/206 X |
| 5,293,250 | 3/1994 | Okumura et al. .................... 358/402 |
| 5,325,310 | 6/1994 | Johnson et al. ...................... 709/206 |
| 5,339,361 | 8/1994 | Schwalm et al. ...................... 380/23 |
| 5,379,340 | 1/1995 | Overend et al. ....................... 379/93 |
| 5,406,557 | 4/1995 | Baudoin .......................... 709/246 X |
| 5,416,901 | 5/1995 | Torres .................................. 395/159 |
| 5,424,724 | 6/1995 | Williams et al. ................ 340/825.05 |
| 5,438,660 | 8/1995 | Lee et al. ............................. 395/345 |
| 5,452,099 | 9/1995 | Von Meister ........................ 358/403 |
| 5,475,757 | 12/1995 | Kelly ...................................... 380/24 |
| 5,495,595 | 2/1996 | Peters et al. ......................... 395/500 |
| 5,509,071 | 4/1996 | Petrie, Jr. et al. ....................... 380/4 |
| 5,528,605 | 6/1996 | Ywoskus et al. ....................... 371/33 |
| 5,548,745 | 8/1996 | Egan et al. ........................... 395/500 |
| 5,553,083 | 9/1996 | Miller .................................... 371/32 |
| 5,557,659 | 9/1996 | Hyde-Thomson ..................... 379/88 |
| 5,559,947 | 9/1996 | Wugofski ............................. 395/159 |
| 5,568,383 | 10/1996 | Johnson et al. ................. 364/419.02 |
| 5,568,540 | 10/1996 | Greco et al. ............................ 379/89 |
| 5,630,066 | 5/1997 | Gosling ............................... 709/221 |
| 5,675,507 | 10/1997 | Bobo, II ........................... 364/514 R |
| 5,680,551 | 10/1997 | Martino, II .......................... 709/226 |
| 5,790,790 | 8/1998 | Smith et al. ......................... 709/206 |
| 5,850,520 | 12/1998 | Griebenow et al. ................. 709/206 |

\* cited by examiner

```
/*
PROGRAMMER'S NAME : HARESH GUJARATHI
DATE              : 06/29/1996
PROJECT NAME      : ENVELOPE.MAK
FILE NAME         : ENVPHEAD.H

HEADER DEFINATION FOR ENVELOPE FILE
*/

#INCLUDE "SSDEFINE.H"
#INCLUDE "WINDOWS.H"

#IFNDEF _ENVPHEAD_H_
#DEFINE _ENVPHEAD_H_

TYPEDEF STRUCT TAGENVELOPEHEADER
{
  UNSIGNED SHORT SSIZE;
  CHAR CHMAJORVERSION;
  CHAR CHMINORVERSION;
  SHORT SDATATYPE;
  WORD USECRUITYATTRIBUTES;          // UINT IN 16 BIT ENVELOPE
  WORD USESECURITYMETHODSATTRIBUTES:                  // UINT IN 16 BIT ENVELOPE
  WORD UENVELOPEATTRIBUTES;                  // UINT IN 16 BIT ENVELOPE
  STR31 SZPLAYERNAME;    // C STRING

WORD UCOMMAND;         // UINT IN 16 BIT ENVELOPE
  STR255 SZVALUE;  // COULD BE THE URL, C-STRING

STR31 SZSENDERNAME;  // C STRING
  STR31 SZPACKAGENAME;  // C STRING

// NEW FOR HALLMARK
  UNSIGNED LONG SRESERVEDDATALENGTH;
  UNSIGNED LONG SRESERVEDDATAOFFSET;  //RESERVED DATA COMES AFTER SLIP DATA BUT BEFORE COMPONENT DATA
  UNSIGNED SHORT STEMPLATETYPE;   // 1: VANILLA
                 // 2: CUSTOM
  UNSIGNED LONG SCOMPONENTDATALENGTH;
  UNSIGNED LONG SCOMPONENTDATAOFFSET;     // COMPONENT DATA COMES AFTER RESERVED DATA
}

ENVELOPEHEADER;

ENUM {
   SECURITYATTR_NOTSECURED  = 0x0000,
   SECURITYATTR_SECURED     = 0x0001,
   SECURITYATTR_WASSECURED  = 0x0002,
};

ENUM {
   ENEVELOPATTR_CLEAN = 0x0000,
   ENEVELOPATTR_SENT  = 0x0001
};

ENUM {
   SECURITYMETHOD_RC4      = 0x0001,
   SECURITYMETHOD_RC4_MAC  = 0x0002,
};

ENUM {
   COMMAND_LAUNCH    = 0x0001,
   COMMAND_JAVA      = 0x002,
   COMMAND_FETCHURL  = 0x0004
};

#ENDIF   // _ENVPHEAD_H_

#DEFINE APP_MINOR_VERSION 0
#DEFINE APP_MINOR_VERSION 1
```

FIG. 4

| FIELD | LENGTH | VALUES |
|---|---|---|
| CHECKSUM | 4 BYTES | |
| HEADER LENGTH | 4 BYTES | |
| VERSION | 4 BYTES | |
| FILE INFORMATION SIZE | 4 BYTES | |
| FILE INFORMATION | VARIABLE | EX. "PLATINUM ENVELOPE" |
| CREATOR INFORMATION SIZE | 4 BYTES | |
| CREATOR INFORMATION | VARIABLE | EX. "AMERICA ONLINE" |
| CONTAINER TYPE | 4 BYTES | 1 ENVELOPE<br>2 POSTCARD<br>3 NEWSLETTER<br>4 CD<br>5 ROLLED UP NEWSPAPER<br>6 STACK OF CARDS<br>7 COUPON |
| FRONT COLOR (RED) | 2 BYTES | |
| FRONT COLOR (GREEN) | 2 BYTES | |
| FRONT COLOR (BLUE) | 2 BYTES | |
| BACK COLOR (RED) | 2 BYTES | |
| BACK COLOR (GREEN) | 2 BYTES | |
| BACK COLOR (BLUE) | 2 BYTES | |
| ENVELOPE SIZE (W) | 2 BYTES | SIZE IN PIXELS |
| ENVELOPE SIZE (H) | 2 BYTES | |
| RESERVED DATA LENGTH | 4 BYTES | |
| RESERVED DATA | VARIABLE | |
| DATA LOCATION | BYTE | 1 DATA FIELD<br>2 FETCH DATA USING URL<br>3 OFFSET TO COMPONENT LOCATION (ABSOLUTE OFFSET) |
| DATA LENGTH | 4 BYTES | LENGTH OF ALL SUB-COMPONENTS. |
| DATA | VARIABLE | |

FIG. 7

| FIELD | LENGTH | VALUES |
|---|---|---|
| COMPONENT ID | BYTE | |
| COMPONENT LENGTH | 4 BYTES | |
| COMPONENT ATTRIBUTES | BYTE | 1 INVISIBLE<br>2 FRONT<br>3 BACK |
| COMPONENT LOCATION (H) | 2 BYTES | LOCATION ON SCREEN |
| COMPONENT LOCATION (V) | 2 BYTES | |
| COMPONENT SIZE (W) | 2 BYTES | SIZE IN PIXELS |
| COMPONENT SIZE (H) | 2 BYTES | |
| DATA LOCATION | BYTE | 1 DATA FIELD<br>2 FETCH DATA USING URL<br>3 OFFSET TO OTHER COMPONENT'S DATA LENGTH FILED (ABSOLUTE OFFSET)<br>4 GET DATA USING FTP |
| DATA LENGTH | 4 BYTES | LENGTH OF ALL SUB-COMPONENTS |
| DATA | VARIABLE | |

FIG. 8

| FIELD | LENGTH | VALUES | |
|---|---|---|---|
| SUB-COMPONENT ID | BYTE | | |
| SUB-COMPONENT LENGTH | 4 BYTES | | |
| SUB-COMPONENT TYPE | BYTE | 1 | GIF |
| | | 2 | PROCESS |
| | | 3 | AUDIO |
| | | 4 | TEXT |
| | | 5 | VIDEO |
| | | 6 | POSTX |
| | | ⋮ | |
| ATTRIBUTES | BYTE | 0 | NOTHING |
| | | 1 | PROCESS: LAUNCH APPLICATION |
| | | 2 | PROCESS: GOTO URL |
| | | 3 | PROCESS: SEND EMAIL |
| | | 4 | CONDITIONAL DISPLAY |
| | | 5 | CUSTOM RECEIPT |
| | | 6 | PROCESS FTP |
| | | 1 | GIF: FRONT BRUSH |
| | | 2 | GIF: BACK BRUSH |
| | | 1 | OPEN |
| | | 2 | COPY |
| | | 3 | PRINT |
| | | ⋮ | |
| ID TYPE | BYTE | 0 | PRIMARY SUB-COMPONENT |
| | | 1 | ALTERNATIVE SUB-COMPONENT |
| ALTERNATE SUB-COMPONENT INDEX | BYTE | 0 | NO ALTERNATE SUB-COMPONENT |
| | | | OR |
| | | | INDEX NUMBER (SEQUENTIAL ORDER RELATIVE TO THE SAME COMPONENT.) |
| USER'S ACTION | BYTE | 0 | NOTHING |
| | | 1 | MOUSE OVER |
| | | 2 | MOUSE CLICK |
| | | 3 | MOUSE DOUBLE CLICK |
| | | ⋮ | |
| DATA NAME LENGTH | 4 BYTES | | |
| DATA NAME | VARIABLE | ATTACHMENT NAME OR DATA NAME | |
| DATA LOCATION | BYTE | 1 | ATTACHMENT LIST |
| | | 2 | DATA FIELD OFFSET TO OTHER SUB-COMPONENT'S DATA LENGTH FIELD. (ABSOLUTE OFFSET) |
| | | 3 | FETCH DATA USING URL |
| | | 4 | GET DATA USING FTP |
| | | ⋮ | |
| DATA LENGTH | 4 BYTES | | |
| DATA | VARIABLE | DATA | |

FIG.9

| FIELD | LENGTH | VALUES | DESCRIPTION |
|---|---|---|---|
| CHECKSUM | 4 BYTES | | |
| HEADER LENGTH | 4 BYTES | | |
| VERSION | 4 BYTES | | |
| FILE INFORMATION SIZE | 4 BYTES | | |
| FILE INFORMATION | VARIABLE | "PLATINUM ENVELOPE" | |
| CREATOR INFORMATION SIZE | 4 BYTES | | |
| CREATOR INFORMATION | VARIABLE | "POSTX" | |
| CONTAINER TYPE | BYTE | 1 | ENVELOPE |
| FRONT COLOR (RED) | 2 BYTES | 0 | BLACK |
| FRONT COLOR (GREEN) | 2 BYTES | 0 | |
| FRONT COLOR (BLUE) | 2 BYTES | 0 | |
| BACK COLOR (RED) | 2 BYTES | 255 | YELLOW |
| BACK COLOR (GREEN) | 2 BYTES | 255 | |
| BACK COLOR (BLUE) | 2 BYTES | 0 | WIDTH IN PIXELS |
| ENVELOPE SIZE (W) | 2 BYTES | 800 | HEIGHT IN PIXELS |
| ENVELOPE SIZE (H) | 2 BYTES | 600 | |
| RESERVED DATA LENGTH | 4 BYTES | | |
| RESERVED DATA | VARIABLE | | |
| DATA LOCATION | BYTE | 1 | DATA FIELD |
| DATA LENGTH | 4 BYTES | | LENGTH OF ALL SUB-COMPONENTS. |
| DATA | VARIABLE | | |

FIG. 16A

| FIELD | LENGTH | VALUES | DECSRIPTION |
|---|---|---|---|
| COMPONENT ID | BYTE | 15 | COMPONENT ID |
| COMPONENT LENGTH | 4 BYTES | | |
| COMPONENT ATTRIBUTES | BYTE | 2 | (FRONT) |
| COMPONENT LOCATION (H) | 2 BYTES | 100 | (LOCATION ON SCREEN) |
| COMPONENT LOCATION (V) | 2 BYTES | 500 | |
| COMPONENT SIZE (W) | 2 BYTES | 50 | (SIZE IN PIXELS) |
| COMPONENT SIZE (H) | 2 BYTES | 50 | |
| DATA LOCATION | BYTE | 1 | DATA FIELD |
| DATA LENGTH | 4 BYTES | | LENGTH OF ALL SUB-COMPONENTS |
| DATA | VARIABLE | | THE GIF FILE. |

FIG. 16B1

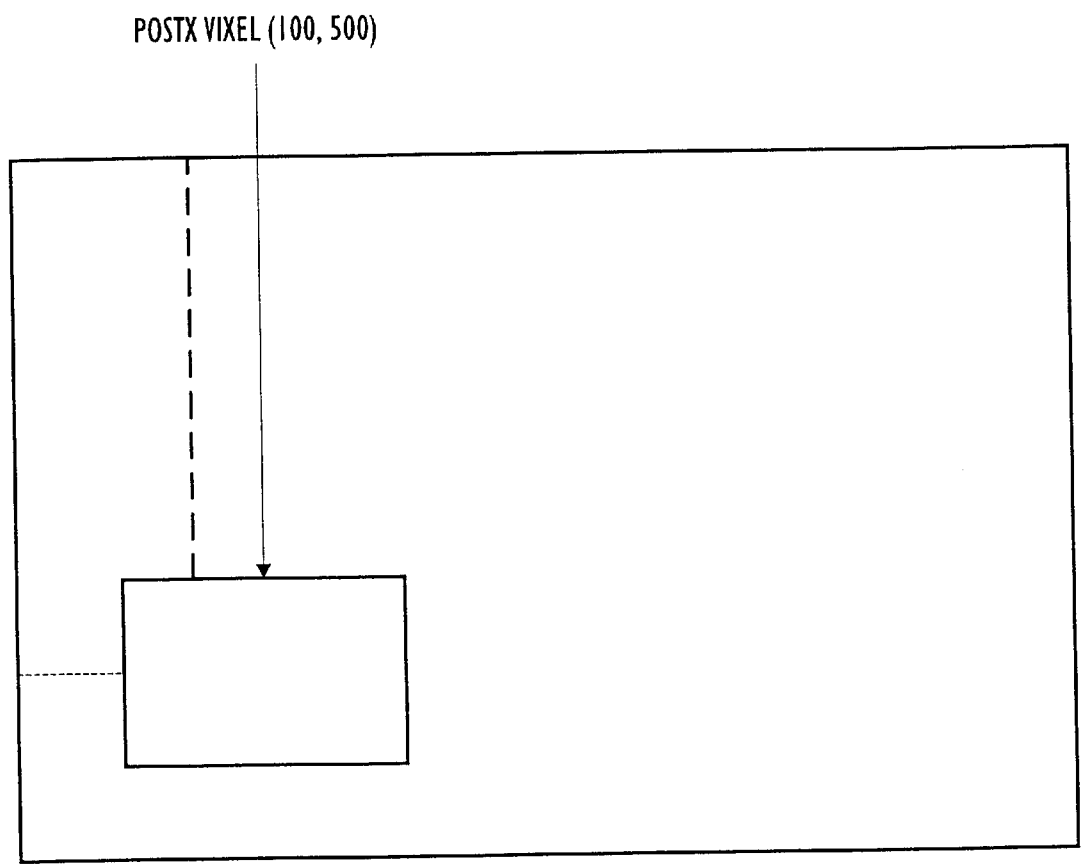
FIG. 16B2

| FIELD | LENGTH | VALUES | DESCRIPTION |
|---|---|---|---|
| SUB-COMPONENT ID | BYTE | 160 | SUB-COMPONENT ID |
| SUB-COMPONENT LENGTH | 4 BYTES | | |
| SUB-COMPONENT TYPE | BYTE | 4 | TEXT |
| ATTRIBUTES | BYTE | 0 | NOTHING |
| ID TYPE | BYTE | 0 | PRIMARY SUB-COMPONENT |
| ALTERNATE SUB-COMPONENT INDEX | BYTE | 0 | NO ALTERNATE SUB-COMPONENT |
| ACTION | BYTE | 1 | MOUSE OVER |
| DATA NAME LENGTH | 4 BYTES | | |
| DATA NAME | VARIABLE | "BUBBLE.TXT" | ATTACHMENT NAME |
| DATA LOCATION | BYTE | 1 | ATTACHMENT LIST |
| DATA LENGTH | 4 BYTES | 0 | |
| DATA | VARIABLE | NO DATA | |

FIG. 16C1

| FIELD | LENGTH | VALUES | DESCRIPTION |
|---|---|---|---|
| SUB-COMPONENT ID | BYTE | 160 | SUB-COMPONENT ID |
| SUB-COMPONENT LENGTH | 4 BYTES | | |
| SUB-COMPONENT TYPE | BYTE | 3 | AUDIO |
| ATTRIBUTES | BYTE | 1 | PROCESS: LAUNCH APPLICATION |
| ID TYPE | BYTE | 0 | PRIMARY SUB-COMPONENT |
| ALTERNATE SUB-COMPONENT INDEX | BYTE | 0 | NO ALTERNATE SUB-COMPONENT |
| ACTION | BYTE | 1 | MOUSE OVER |
| DATA NAME LENGTH | 4 BYTES | | |
| DATA NAME | VARIABLE | "SIGNATURE.RMF" | ATTACHMENT NAME |
| DATA LOCATION | BYTE | 1 | ATTACHMENT LIST |
| DATA LENGTH | 4 BYTES | 0 | |
| DATA | VARIABLE | NO DATA | |

FIG. 16C2

| FIELD | LENGTH | VALUES | DESCRIPTION |
|---|---|---|---|
| SUB-COMPONENT ID | BYTE | 160 | SUB-COMPONENT ID |
| SUB-COMPONENT LENGTH | 4 BYTES | | |
| SUB-COMPONENT TYPE | BYTE | 2 | PROCESS |
| ATTRIBUTES | BYTE | 2 | PROCESS: GO TO URL |
| ID TYPE | BYTE | 0 | PRIMARY SUB-COMPONENT |
| ALTERNATE SUB-COMPONENT INDEX | BYTE | 3 | (INDEX OF ALTERNATE SUB-COMPONENT) |
| ACTION | BYTE | 2 | MOUSE CLICK |
| DATA NAME LENGTH | 4 BYTES | | |
| DATA NAME | VARIABLE | "POSTXURL..TXT" | ATTACHMENT NAME |
| DATA LOCATION | BYTE | 1 | ATTACHMENT LIST |
| DATA LENGTH | 4 BYTES | 0 | |
| DATA | VARIABLE | NO DATA | |

FIG. 16C3

| FIELD | LENGTH | VALUES | DESCRIPTION |
|---|---|---|---|
| SUB-COMPONENT ID | BYTE | 77 | SUB-COMPONENT ID |
| SUB-COMPONENT LENGTH | 4 BYTES | | |
| SUB-COMPONENT TYPE | BYTE | 2 | PROCESS |
| ATTRIBUTES | BYTE | 0 | PROCESS: LAUNCH APPLICATION (TO DISPLAY TEXT) |
| ID TYPE | BYTE | 1 | ALTERNATE SUB-COMPONENT |
| ALTERNATE SUB-COMPONENT INDEX | BYTE | 0 | NO ALTERNATE SUB-COMPONENT |
| ACTION | BYTE | 2 | MOUSE CLICK |
| DATA NAME LENGTH | 4 BYTES | | |
| DATA NAME | VARIABLE | "ALTERNATE.TXT" | ATTACHMENT NAME |
| DATA LOCATION | BYTE | 1 | ATTACHMENT LIST |
| DATA LENGTH | 4 BYTES | 0 | |
| DATA | VARIABLE | NO DATA | |

Ever had trouble sending graphics to a different mail system?
Ever sent mail and wondered if it had been received?
Ever wondered how confidential your e-mail really is?
If youv'e ever asked these questions...
DO WE EVER HAVE SOMETHING FOR YOU

Introducing PostX Envelope

| Easily sends & receives rich text documents and images | ☺ Your Name ✉ | Sends you a receipt when an Envelope you have sent is opened |
|---|---|---|
| | Send To: ◇ Send | |
| | ⓈPostX Corporation | |
| Protects your privacy with a password activated lock | Title: ◇ Send Later | Send now, send later attach stickies, all from the simple interface |
| | ⬢ ✎ ◇ Open | |
| | Unlocked Note Respectively | |

So what can PostX Envelope do for me?

| SOFTWARE DOWNLOAD | CUSTOMER SUPPORT | WHAT'S NEW | DOWNLOAD OPENER | ABOUT POSTX | CONTACT POSTX | software + support + what's new + download opener + about PostX + contact PostX
text only homepage

| best viewed with | G E N U I N E | site by |
|  NETSCAPE |  RSA ENCRPYTION ENGINE | blissworks |

*Copyright © 1994-1997 PostX Corporation, All Rights Reserved.*
*PostX is a registered trademark of PostX Corporation.*
*All other trademarks and service marks belong to their respective holders.*

PostX is a company located in Cupertino, CA.

FIG. 17D

METHOD OF PROCESSING AN E-MAIL MESSAGE THAT INCLUDES A REPRESENTATION OF AN ENVELOPE

This application is a Division of Ser. No. 08/845,722 Apr. 25, 1997 U.S. Pat. No. 6,014,688.

FIELD OF THE INVENTION

The present invention relates to an E-mail software program enhancement, and, more particularly, an e-mail program capable of transmitting, opening and presenting a container having digital content (e.g. Visual images, audio) using embedded executable software.

BACKGROUND OF THE INVENTION

Conventional E-mail systems transmit textual messages from a sender to a receiver. It is also customary to send attachments with messages, the attachments containing files that the sender desires forwarding to the receiver.

Despite the vast usage of E-mail and E-mail systems, certain drawbacks still exist. Among these drawbacks include lack of privacy and verification of message receipt. While encryption systems exist that can provide for privacy and verification of message receipt, such encryption systems become tedious to properly use, and are, therefore, avoided in many circumstances due to the fact that they are difficult to use. Since typical E-mails are not secure in a heterogeneous environment and there is no verification of message receipt, E-mail messages are typically used only for low priority communications.

Furthermore, messages that are sent via one E-mail platform cannot be reliably transmitted to another E-mail platform and still ensure that different types of content appear as desired. For this and other reasons, E-mail messages typically lack interesting different types of content, such as visual images, audio, multimedia, and other functional attributes, such as, for instance, links to a sender's home page on the world wide web. Accordingly, since only text based content can be easily transmitted and received in a reliable manner, most E-mail transmissions tend to use textual content that looks similar, with attachments of files that are similarly uninteresting.

As a result, a more robust enhancement to conventional E-mail platforms is needed in order to reliably overcome the above mentioned drawbacks.

SUMMARY OF THE INVENTION

It is an object of the present invention to provide an E-mail message enhancement apparatus that allows for privacy and verification of message receipt.

It is another object of the present invention to provide an E-mail message enhancement apparatus that can be reliably transmitted from one E-mail platform to another E-mail platform.

It is a further object of the present invention to provide an E-mail message enhancement apparatus that allows for the transmission, reception and layout of interesting different types of content.

The above objects of the present invention, among others, are provided by the present invention through the E-mail message enhancement apparatus which is preferably implemented through a sequence of program instructions and achieved as attachments to e-mail message. On the sender side, creation software implements a data format that allows for differing types of digital content. Furthermore, in addition to such content in the E-mail message, there is included attachments, header information, including the E-mail address of the sender, and recipient executable embedded software that ensures the recipient will be able to view contents and perform the functional attributes that make up the E-mail message.

In a preferred embodiment of the invention, the executable software that is transmitted as part of the E-mail message is written using Java programming language and contains a self-opening message feature, such that the container automatically opens and is initially viewed with all of the desired content appearing. Thereafter, depending upon the content originally included by the sender, and the action taken on the part of the recipient, different portions of the content and functional attributes are highlighted. Such content and functional attributes will be view able, regardless of the E-mail platform of the recipient, due to the inclusion of the executable software in the E-mail message itself that is transmitted.

Through the use of a data structure that allows for a plurality of component objects to be included in a single E-mail message, as well as a plurality of sub-component objects to be associated with each component object, an E-mail message having robust content and functional attributes can be achieved.

In a specific embodiment of the invention, the E-mail message that is transmitted has a plurality of component objects, with one of the component objects representing the front face of an envelope, and different other component objects including, but not limited to, recipient address, sender address, stamp, digital time stamp, and an envelope open attribute so that the E-mail message appears on the recipient's computer screen like an envelope. When the E-mail message is opened using the envelope open attribute, or subsequently closed, verification of message receipt is automatically forwarded back to the original sender. In a specific form of this embodiment, both sides of the envelope can be represented, with another component object representing the back side of the envelope and the envelope open attribute that allows for attachments or messages within the envelope to be viewed appearing on the back side of the envelope.

In another specific embodiment of the present invention, the E-mail message that is transmitted has a plurality of component objects, with one of the component objects representing the front face of a postcard, and different other component objects represented on the back face of the postcard being the recipient address, sender address, stamp, senders letter and digital time stamp.

Still furthermore, the size and shape of component objects can be varied as desired by the sender, overlap with each other and vary in number within a single E-mail message. Accordingly, the appearance of the E-mail message can be varied as desired by the sender.

BRIEF DESCRIPTION OF THE DRAWINGS

The structural and functional aspects of the invention will become understood by those skilled in the art by reference to the following detailed description when taken in conjunction with the appended drawings, in which:

FIG. 4 illustrates the contents of an envelope header in an envelope data file according to the invention;

FIG. 7 illustrates the contents of a component object header data structure according to the invention;

FIG. 8 illustrates the contents of a component object data structure according to the invention;

FIG. 9 illustrates the contents of a component object property data structure according to the invention;

FIGS. 16A, 16B1–16B2 and 16C1–16C4 illustrates example data structures for an envelope container having a company logo as an object component according to the invention; and FIGS. 17A–17D illustrate views and actions that result from the data structures such as set forth in FIGS. 16A, 16B1–16B2 and 16C1–16C4.

DETAILED DESCRIPTION OF THE PREFERRED EMBODIMENT

Figure 1:
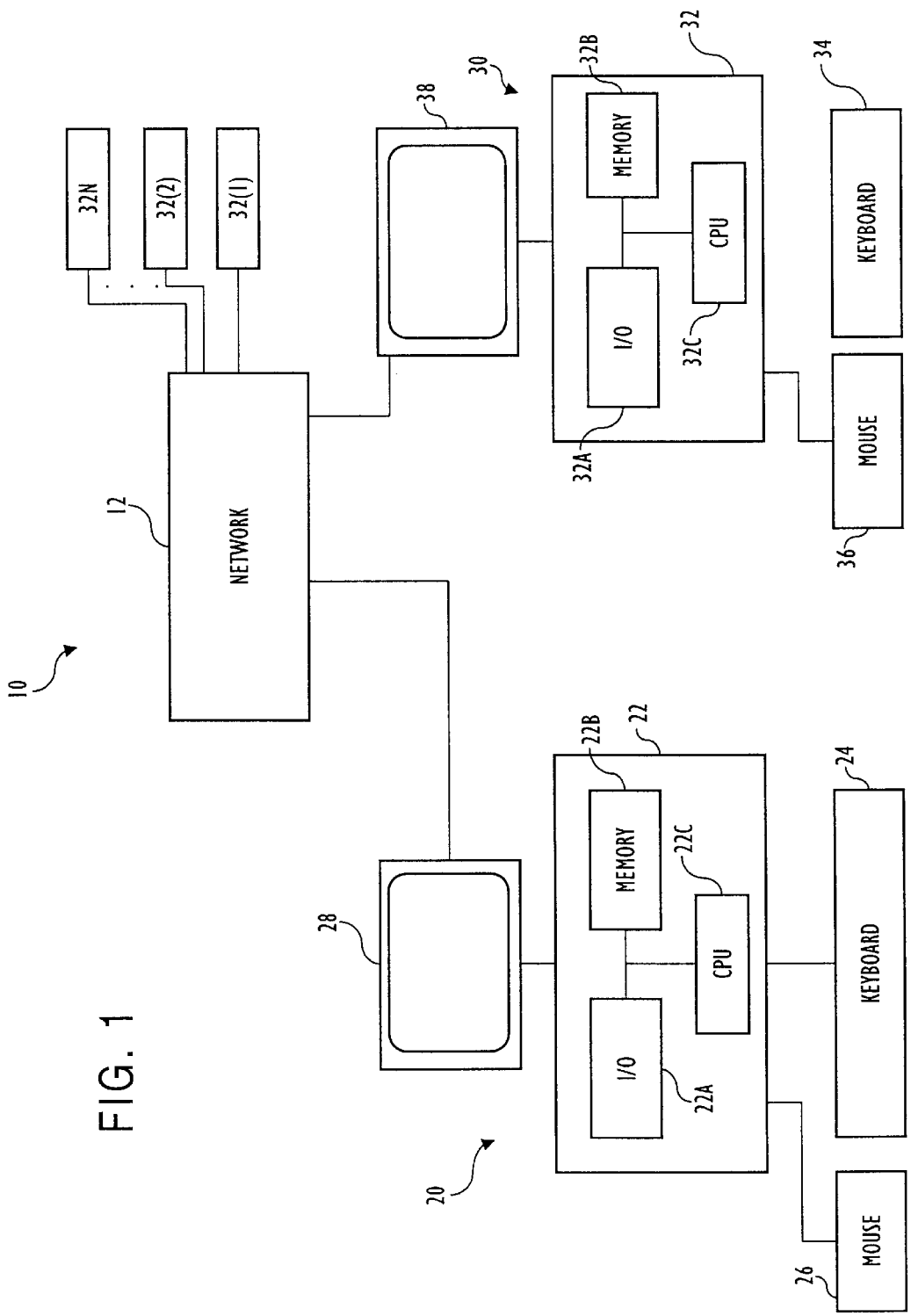
FIG. 1 is a diagram illustrating an implementation of the invention in a computer network.

FIG. 1 illustrates a computer network 10 which operates upon the E-mail enhancement program according to the present invention. A sender computer 20 communicates with a recipient computer 30 through a network 12. Of course, additional computers, represented as computers 32(1), 32(2)... 32(n) can also be connected to the network 12 and be used to send and receive E-mail messages.

Sender computer 20 contains, as is known, a computing portion 22 that contains, as is known, I/O 22A, memory 22B and some type of processor 22C, which can be in the form of, for instance, a microprocessor. Attached to the computing portion 22 is a keyboard 24, a mouse 26, and a display 28. Similarly, recipient computer 30 contains, as is known, a computing portion 32 that contains, as is known, I/O 32A, memory 32B and some type of processor 32C, which can be in the form of, for instance, a microprocessor. Attached to the computing portion 32 is a keyboard 34, a mouse 36, and a display 38.

Creation executable software according to the present invention contains sequences of program instructions that allow for the creation of an enhanced E-mail message according to the present invention, as well as the transmission of the created message through the network to the recipient. Recipient executable software according to the present invention contains a different sequence of program instructions that allow for the receipt, and thus visual, audible and functional attributes to be obtained by the recipient.

There currently exist two different embodiments of the software according to the present invention. In a first, version of the software, the creation and recipient executable software is loaded into the memory 22B of the sender computer 20. When this embodiment of the software is used, the E-mail message structure contains, as described hereinafter, a portion that attaches the recipient executable software to the E-mail message transmitted from the sender to the recipient. So long as the recipient computer 30 can operate as a Java virtual machine, the recipient computer 30 will receive the E-mail message containing the recipient executable software, preferably written in Java, and use that recipient executable software to display the enhanced E-mail message on the display 38 of the recipient computer 30.

In a second, native version of the software, the creation executable software is loaded into the memory 22B of the sender computer 20, and the recipient executable software is loaded into the memory 32B of the recipient computer 32. In this embodiment, the transmitted E-mail message will not contain the recipient executable software, since the recipient executable software will already reside on the recipient computer 30.

It should of course be understood that the present invention is not to be interpreted in a manner that limits the present invention to a specific sequence of program instructions. The descriptions given herein, as well as a review of the source code attached hereto, provide the teachings necessary to implement the present invention in different programming languages and on different operating system platforms.

FIGS. 2–9 will now be described, which figures illustrate the data format which the Java executable software version implements. Those specific fields which are believed to be self explanatory will not be described in detail. Before describing this data format in further detail, however, reference is made to FIG. 12, which illustrates an enhanced E-mail initial container display 100 made up of component objects 102, 104, 106 and 108. It should be noted that the number of component objects in any initial display can be varied, as can the size and shape of each of the component objects. Also, it should be noted that the component object is also referred to in certain of the drawings and potentially the specification text as a "Vixel", which term is a trademark of PostX Corporation. The initial display 100 provides a display that is also referred to in certain of the drawings and potentially the specification text as "Active View", which term is a trademark of PostX Corporation.

Figure 2:
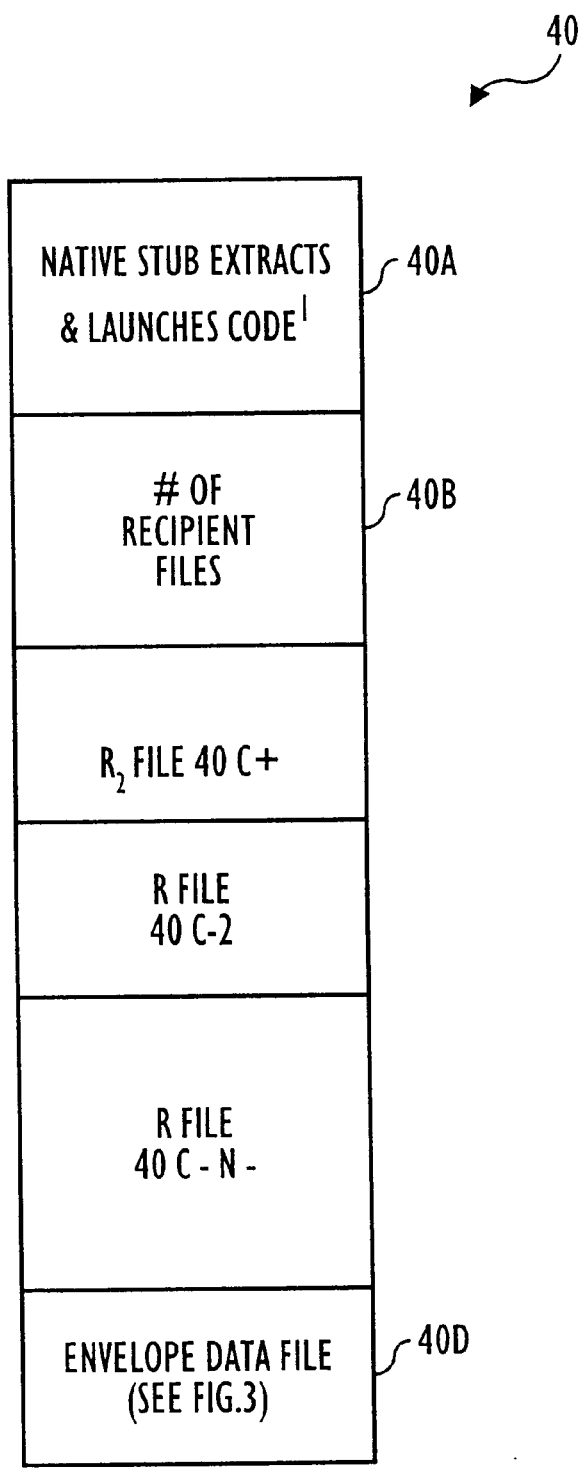
FIG. 2 illustrates an E-mail message format for an enhanced E-mail message according to the invention.

FIG. 2 illustrates the E-mail message format for the enhanced E-mail message according to the present invention. This data format 40 includes a native stub code 40A that provides for a self-opening envelope at the present time, despite the fact that Java classes are not presently defined so that self-opening can occur without the use of such a native stub. Thereafter, data 40B indicates the number of recipient executable files, which files then follow as files 1, 2... n, which are labeled as 40C-1, 40C-2... 40C-n, the number of which will be determined by the different number and type of images, sounds, and functional attributes that the sender inserts into the enhanced E-mail message that is sent. Container/envelope data file 40D follows thereafter, which file is further described with reference to FIG. 3.

Figure 3:
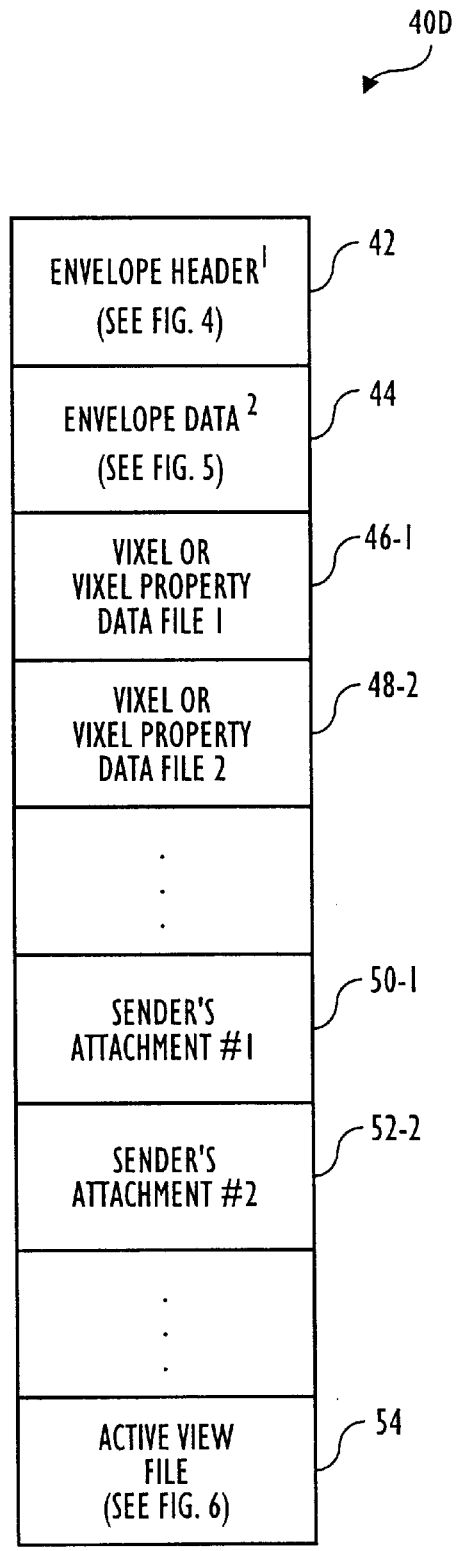
FIG. 3 illustrates the format of an envelope data structure according to the invention.
Figure 5:
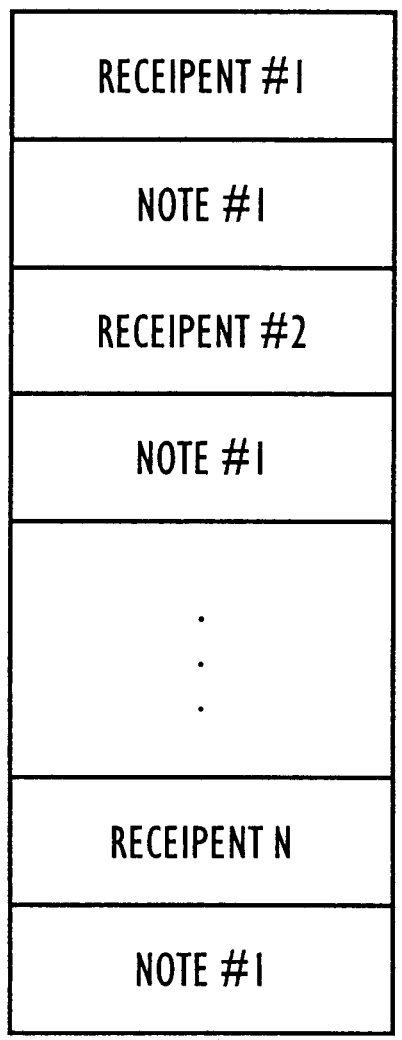
FIG. 5 illustrates envelope data.

As illustrated in FIG. 3, the envelope data file 40D contains an envelope header 42, the contents of which are provided in detail in FIG. 4. Of note with respect to the contents of the FIG. 4 header is the return E-mail address of the sender, as well as the recipient name that is used in the return receipt E-mail function described further hereinafter, as well as an indication of whether the E-mail message is encrypted as described further hereinafter. It should be noted that the header is not encrypted.

As also illustrated in FIG. 3, the envelope data file 40D contains envelope data 44, which includes the list of attachments sent by the sender, and recipients and sender's letter. Senders Attachments 50-1, 50-2. . . 50-n represent attachments that are included within the enhanced E-mail message, as will be described in more detail hereinafter, as will be the contents of the component objects file 54, also referred to as the Active View file, the contents of which are set forth in FIG. 6.

Figure 6:
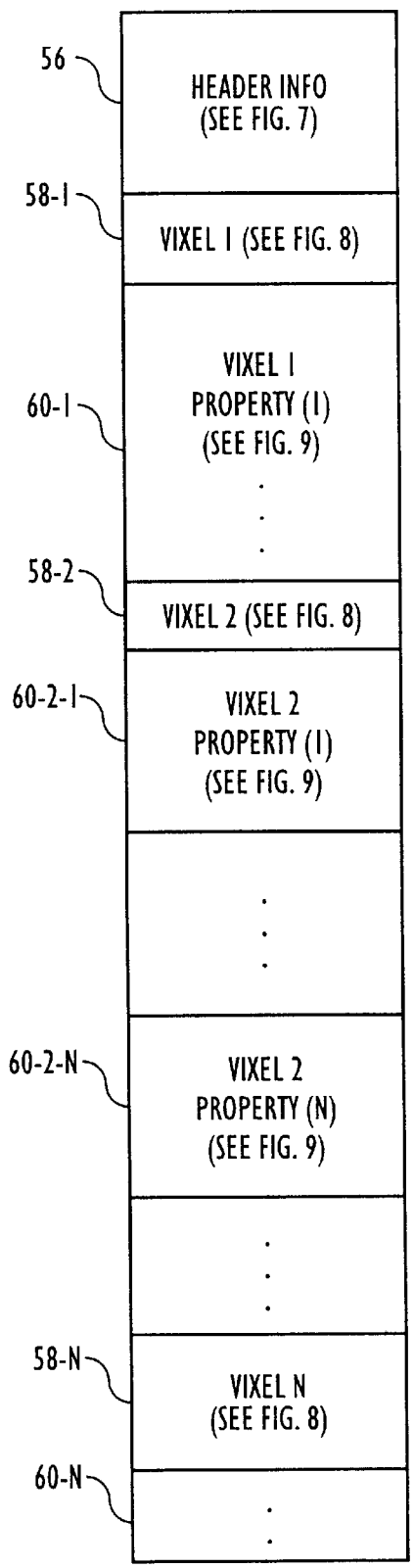
FIG. 6 is a diagram illustrating a component objects file according to the invention.

As shown in FIG. 6, component objects file 54 includes a component object header data structure 56, followed by component object or Vixel data structure 58-1, 58-2. . . 58-n, and component object property or Vixen property data structures 60-1, 60-2, 60-2-n . . . 60-n. The contents of the component object header data structure 56 are set forth in FIG. 7, the contents of the component object property data structures 58 are set forth in FIG. 8, and the contents of sub-component object property data structures 60 are set forth in FIG. 9.

Of note with respect to the contents of the header data structure illustrated in FIG. 7 is that the "platinum envelope" entry for the file information is used as a description information, no conditional processing is done with this field. The identifiers for "Container Type" correspond to different representations of default containers.

A default "envelope" container contains component objects representing the front face of an envelope, and different other component objects being recipient address, sender address, stamp, digital time stamp, the back side of the envelope and the envelope open attribute that allows for attachments or messages within the envelope to be viewed appearing on the back side of the envelope so that the E-mail message appears on the recipient's computer screen like an envelope.

A default "postcard" container contains component objects representing the front face of a postcard, and different other component objects represented on the back face of the postcard being the recipient address, sender address, stamp, and digital time stamp.

A default "newsletter" container contains a component object representing each page of a newsletter, as well as various component objects on each page.

A default "CD" container contains a component object for each different audio track for a component object that has a functional attribute of playing music.

A default "Rolled up Newspaper" container contains a component object representing a newspaper, a component object representing the index to the newspaper, and a component object representing each section of the newspaper, as well as component objects for each article if desired.

A default "stack of card" container contain a component object representing each card.

A default "coupon" contains a component object for each coupon that could appear in, for example, a newspaper.

The Front Color indicates the background color that will be used for the container 100, whereas the Envelope Size is used by the default envelope container to represent the width and height dimensions.

The Data Location refers to whether data for the component object requires looking to a data field, fetching data using a URN, or an absolute offset. The data field may be a digital data field that contains digital data, such as digital images from, for instance, a GIFT, a video sequence, an audio sequence, or other representations of images.

For each component object, there exists the data structure illustrated in FIG. 8, which data structure contains a Component ID that allows that component object to be uniquely identified, as well as Component Attributes that identify whether the component object appears as an image on the front and back of a container, or is invisible. If it appears on the front or back of a container, the size of the component object, its location, and the location of data are also specified. If it is an invisible attribute, the size and location data may not be necessary. Also a hidden component object can, for instance, trigger a return receipt without the knowledge of the recipient, such that a mouse over would cause a return receipt if the hidden component object were configured to respond to a mouse over by providing a return receipt when a mouse-over occurs.

Potentially associated with each component object identified by a data field of FIG. 8 are a plurality of sub-component objects. Each sub-component object associated with a component object contains data fields provided in FIG. 9.

Each sub-component object is initiated by a User Action, which User Action is specified by, but not limited to the following, the position and state of the mouse pointer, which state can be that it is not over the component object (no action), appears over the component object (mouse over), there is a single mouse click when it is over the component object, or there is a mouse double click when it is over the component object. Each User Action can cause a Sub-Component-Type to be displayed/initiated. A plurality of sub-components can be associated with a single component object, and be initiated by the same or different User Action.

Each sub-component object also has an ID, as well as an ID type that has associated with it a primary or a secondary sub-component object. The secondary sub-component object will only be initiated if the primary sub-component object is unavailable, as will be described in more detail hereinafter.

Figure 10A:
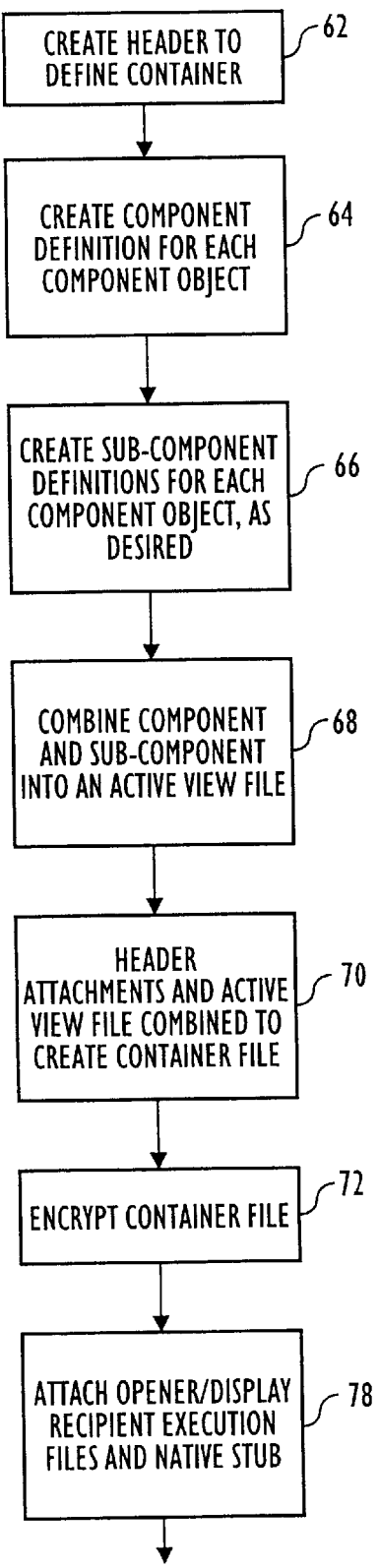
FIGS. 10A and 10B illustrate the process of creating and sending an enhanced E-mail message according to the invention.
Figure 10B:
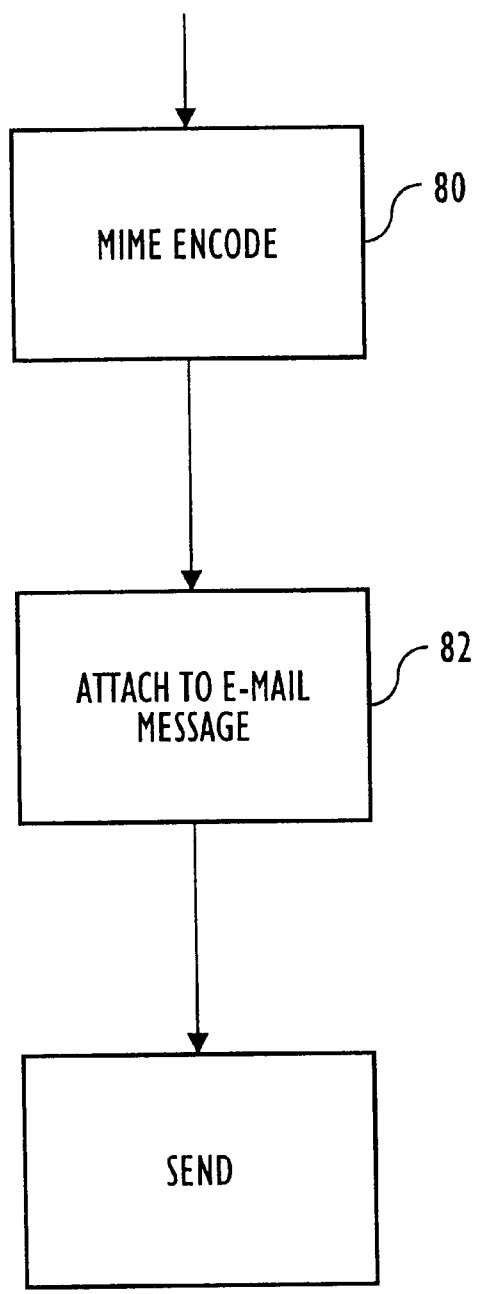
Figure 11:
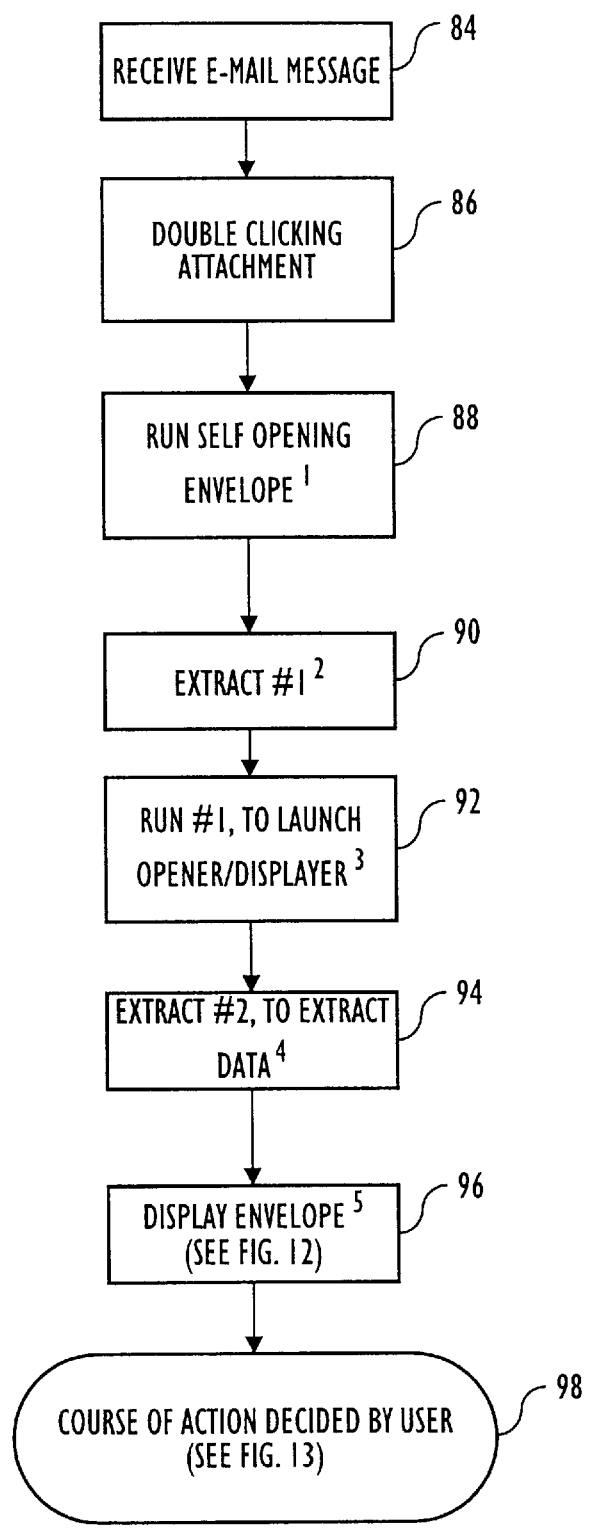
FIG. 11 is a diagram illustrating the process of receiving an enhanced E-mail message according to the invention.
Figure 12:
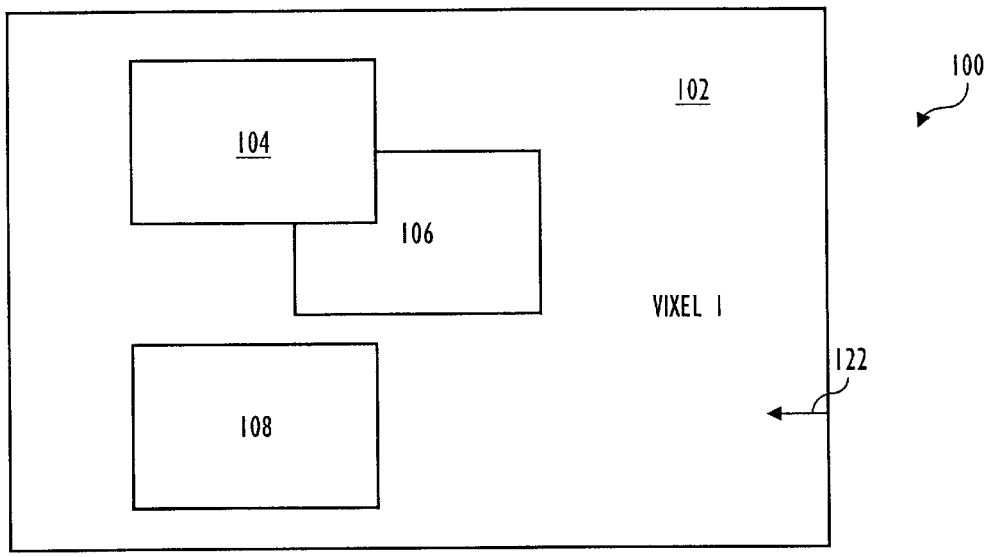
FIG. 12 illustrates an enhanced E-mail message initial container display according to the invention.

Having now described the preferred data format that is used to transmit the enhanced E-mail message according to the present invention, FIGS. 10 and 11 will be referred to in describing the creation and sending, and the receipt, respectively, of an enhanced E-mail message, so that a container such as the container 100 illustrated in FIG. 12 is displayed on the display 38 of a recipient computer 30 after having been sent from a sender computer 20.

The creation and sending of an enhanced E-mail message according to the present invention, as well as initial receipt of an enhanced E-mail message prior to a user event, will now be described with respect to FIGS. 10 and 11.

FIGS. 10A–10B illustrate the process of creating and transmitting an enhanced e-mail message with a container attachment that is self opening and has the other characteristics described herein. In step 62, header information is first designated to define the container. Thereafter, component definitions are created by the sender in a step 64. There can be any number of component definitions desired, with it being understood that the more definitions that exist, the larger the size of the attachment that will ultimately be transmitted. Thereafter, sub-component definitions can be created for each component object, as described previously, is step 66. In step 68, the component and sub-component files are combined into an Active view file, which thereafter is combined with header information and attachments to create a container file in step 70. The container file is encrypted in step 72. Once being encrypted, in the preferred embodiment, the Java class files, collectively termed the recipient executable software, and the native stub are attached to the encrypted container file in step 78. Mime encoding follows in step 80, which mime encoded file is then attached to an e-mail message in step 80 and transmitted.

Upon receipt at the recipient computer in step 84 with reference to FIG. 11, double clicking the received message in step 86 if on a java virtual machine will cause self opening to occurs in step 88, or, alternatively, opening the container attachment. Thereafter, the files are extracted from the attachment in step 90 and invocation of the application (the java virtual machine and the java class files) and extraction of the senders container data files in step 94 will cause the display of the container in step 96. Thereafter, in step 98, the computer 30 awaits the recipients action, as will be further described hereinafter.

Figure 13:
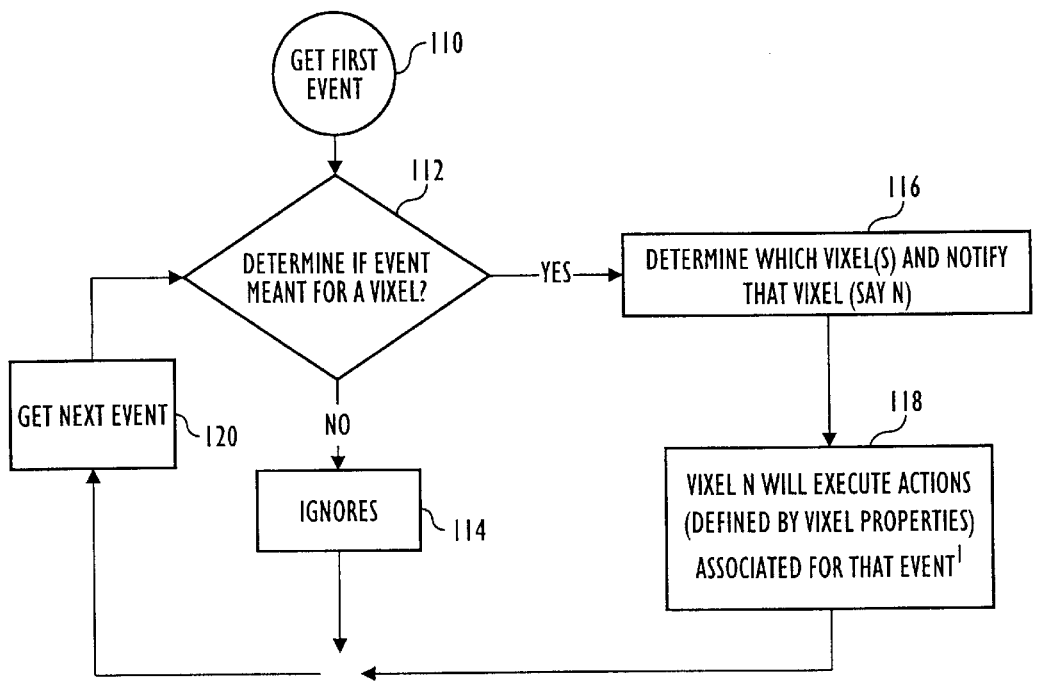
FIG. 13 is a diagram illustrating the process of handling a user action according to the invention.

As a result, of the display on the display 38 of the recipient computer 30, a container, such as the envelope container 100 illustrated in FIG. 12 is obtained. At this time, the recipient executable software then proceeds to a state in which it waits for the user to take an action, as will now be described with respect to FIG. 13.

In step 110, a first event takes place. Step 112 follows and a determination is made in step 112 as to whether the event that takes place is an event that is directed to one or more object components. If it is not such an event, then step 114 follows and the recipient executable software does nothing, and waits for a next event in step 120, Types of nothing events would be, for instance, if the mouse cursor 122 illustrated in FIG. 12. Moves to an area that is not over any object component.

If, however, step 112 determines that the event is directed to a component object/Vixel, then step 116 follows and it is determined which component objects have events, and then in step 118 the action associated with the event intended for each component object takes place.

For instance, if component object 102 illustrated in FIG. 12 contains an User Action of FIG. 9 in the form of a mouse over, then the action of placing the mouse cursor 122 over the component object 102 will cause in step 112 a determination is made that the action involves a component object, and in step 116 a determination that the action pertains to component object 102. Thereafter, step 116 to results and the actions associated with that event will be executed. A specific example of such events will be provided hereinafter.

Figure 14:
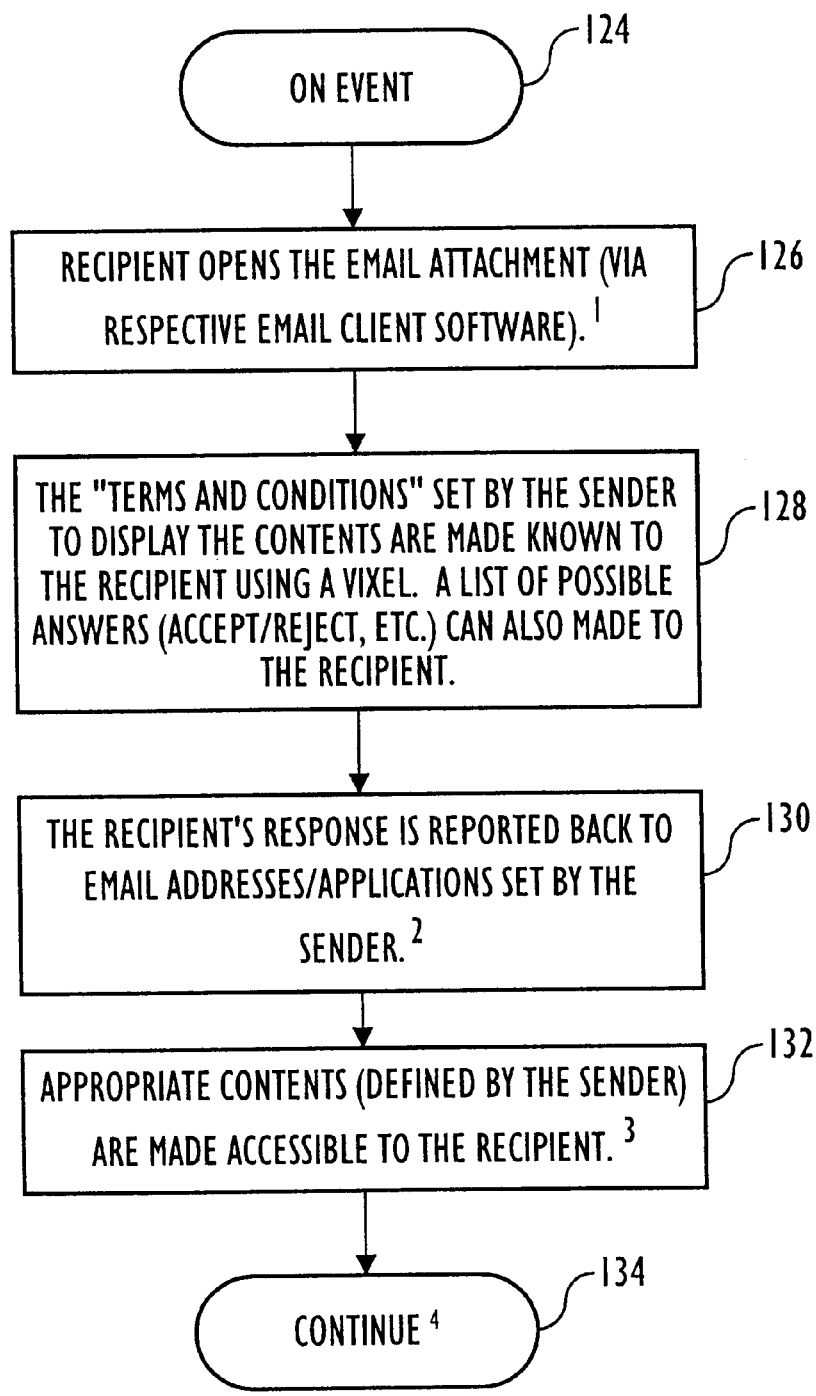
FIG. 14 is a diagram illustrating the process of conditional display of contents if conditions set by the sender according to the invention.

FIG. 14 illustrates one functional attribute of the present invention, which functional attribute can be set forth at the initiation of receiving an enhanced E-mail message according to the present invention, or after the initiation of an action stemming from a component object. An event 124 initiates the conditional display of contents functional attribute. If this conditional display of contents functional attribute occurs at the initiation of the enhanced E-mail message, step 126 follows and the enhanced E-mail message is opened as an attachment, as has been previously described. Step 128 follows, in which terms and conditions which must be agreed upon are first made known to the recipient. Thereafter, step 130 follows and the recipients response is reported back to the sender, in a manner using some form of return receipt as will be described hereinafter. If the conditions responded to in a manner deemed appropriate by the sender, then step 132 follows, and the appropriate contents are then made accessible to the recipient. Step 134, which follows thereafter, waits for another event to occur, as has been previously described with reference to FIG. 13.

Figure 15:
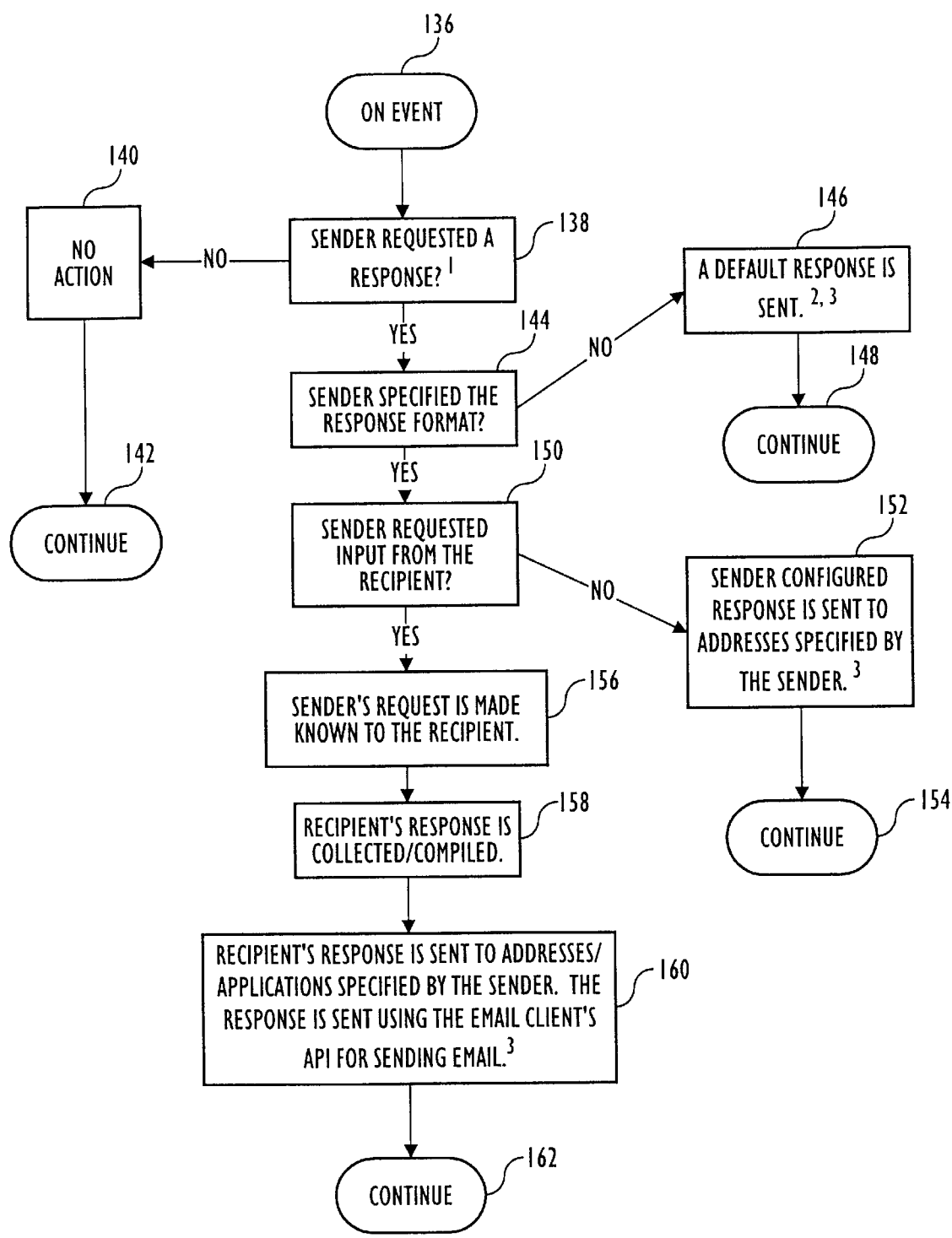
FIG. 15 is a diagram illustrating the process of sending return receipt E-mail messages according to the invention.

FIG. 15 illustrates another functional attribute of the present invention, referred to as a return receipt. If a return receipt is requested by the sender, step 136 is initiated at an appropriate time. This could be when the attachment that forms the enhanced e-mail according to the present invention is initially transmitted to the recipient, when the recipient closes the enhanced e-mail that has been received, or it can be triggered by an event that relates to a sub- component of a component object according to the present invention. If the sender did not request a return receipt when initially sending the message, then step 140 follows, no action is taken, and then step 142 waits for another event to occur, as has been previously described with reference to FIG. 13. If, however, sender requested a return receipt, step 144 follows and a determination is made whether a specific format of response was requested. If not, step 146 follows and a default response, such as "xyz[@0abc].com has opened the envelope at 10:p.m. Pacific daylight time" is transmitted, this response being delivered using the sender address information, and other time information on the system. Step 148 follows and the computer 30 waits for another event to be initiated by the recipient, as has been previously described with reference to FIG. 13.

If a specific format of response was requested in step 144, then step 150 follows and determination is made whether the sender's request requested a specific input from the recipient type of response. If it did not, then the senders configured response is sent in step 152 to addresses specified by the sender, which may be the senders own e-mail address, the address of another, or the address of many others. Thereafter a step 154, like step 148 previously described, follows.

If a response from recipient was requested, then the requested response is made known in step 156 and collected and compiled in step 158. Thereafter, the recipient's response is automatically transmitted in step 160 and another wait step 162 follows.

The return receipt responses transmitted back to the sender in steps 146, 152, and 160 are each automatically sent using the APE provided by respective E-mail client's. For STP, routines to send mail can be written using public domain information.

Figure 17A:
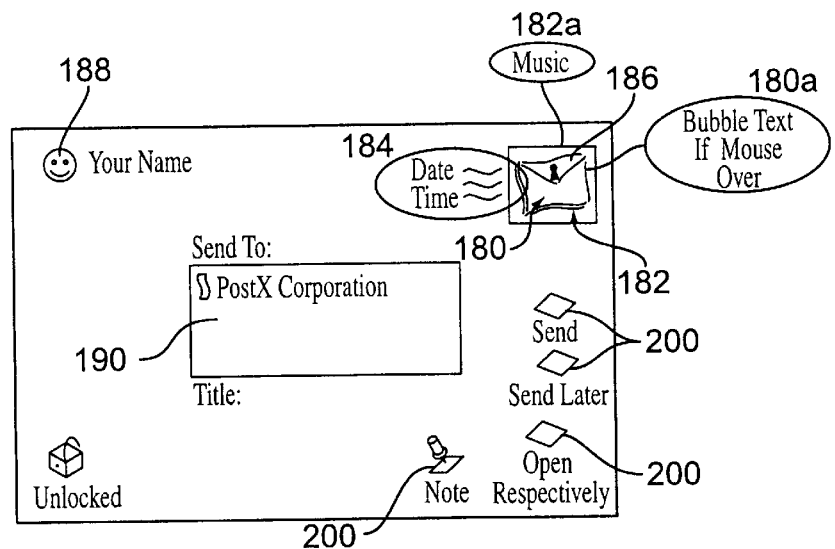
Figure 17B:
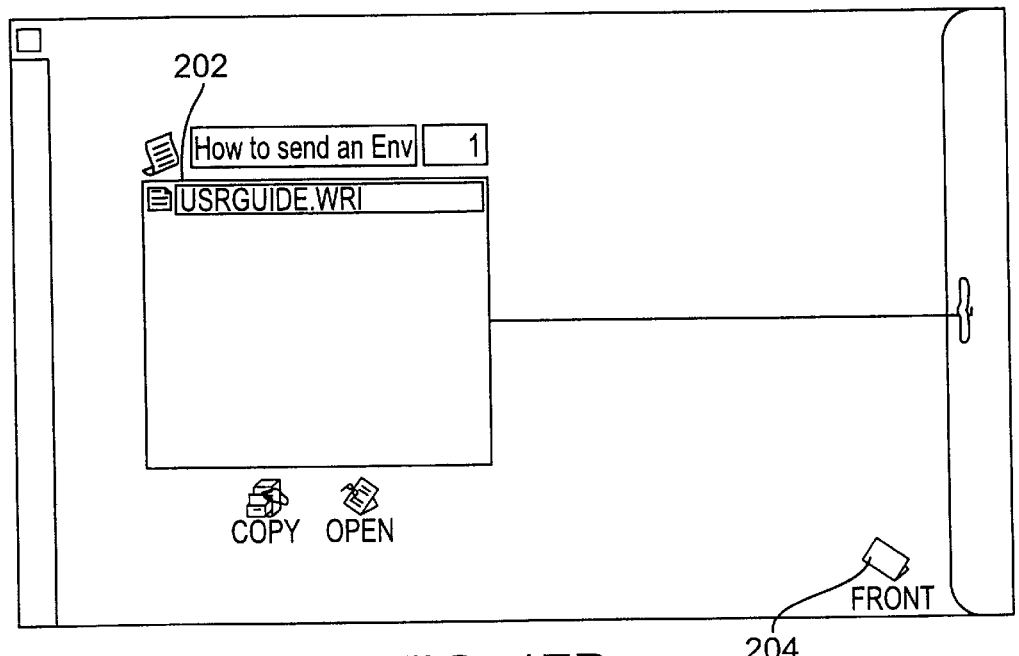

FIGS. 16A, 16B1–16B2 and 16C1–16C4. Illustrate example data structures for an envelope container having a company logo as an object component according to the invention. FIGS. 17A–17D illustrate views and actions that result from the data structures such as set forth in FIGS. 16A, 16B1–16B2 and 161–16C4. So that the capabilities of the present invention can be appreciated, it should be noted that FIG. 17A is represented by the data structure of FIGS. 16a, 16C1 and 16C2; FIG. 17B is represented by the data structure in FIG. 16A; FIG. 17C is represented by the data structure in FIG. 16C3; and FIG. 17D is represented by the data structure in FIG. 16C4.

Of particular note, a mouse over 180 in FIG. 17A results in a bubble 180-A, which corresponds to data associated with the bubble as defined by mouse over action if FIG. 16C1. That has a text sub-component. Similarly, FIG. 16C2. Data defines that the mouse over 182 will cause a process launch attribute that will result in audio music being played by a program containing program instructions to launch the audio content, which programs can also have been transmitted from the sender with the originally sent enhanced e-mail message.

A digital time stamp 184 is also included and indicates either sender transmission time or, in the alternative, a certified time stamp from a dedicated time stamp server.

Object components 188–204 are also illustrated on both sides of the envelope, and represent the ability of the present invention to depict, as desired by the user, many different forms, in many different manners, as well as attributes that then lead the recipient to other areas. For instance, FIG. 16C3., when a mouse click over the stamp object component 186 occurs, if the user is on line at the time, will result in the user automatically being connected to the home page 206 illustrated in FIG. 17A. If, however, that mouse click over the stamp object component 186 occurs, but the user if off line, then the FIG. 16C3. Primary sub-component is not used, but the alternate sub-component that is identified by FIG. 15C4. Is launched, which in this case results in a textual message being displayed.

The above example is intended to show how robust the enhanced e-mail message enhancement apparatus according to the present invention actually is. By being able to be sent as an attachment through E-mail, the appearance of the E-mail message can be enhanced at the option of the sender, and the recipient will be ensured of being able to receive it in the intended form, since the executable recipient program instructions are preferably transmitted as part of the attachment.

Furthermore, even though the executable recipient program instructions can ensure receipt of the message in its intended form, the architecture of the present invention also provides that if a more robust program or hardware element exists on the recipient computer 30, which can even further enhance the content that is transmitted by the sender, then that more robust program or hardware element exists on the recipient computer 30 can be used instead of the executable recipient program instructions that were transmitted by the sender.

While the invention has been particularly shown and described with reference to the preferred embodiments, it will be understood by those skilled in the art that various changes in form and detail may be made therein without departing from the spirit and scope of the present invention.

We claim:

1. A method of processing an e-mail message that includes a representation of an envelope containing a time stamp on a computer screen of a computer, said method comprising the steps of:

receiving, at said computer, said e-mail message that includes said representation of said envelope containing said time stamp;

rendering on said computer screen, using said computer, a representation of a front of said envelope;

rendering on said computer screen, using said computer, said time stamp at a screen location that is within the front of the envelope; and causing, upon initiation of a user action when a cursor is positioned on said computer screen at the screen location corresponding to that of said time stamp, said computer to connect with a location associated with said time stamp, wherein a uniform resource locator is used to determine said location.

2. A method according to claim 1, wherein said step of rendering said envelope renders said envelope front so that it is rectangular in shape and said time stamp is located on the upper right hand corner of said rectangular envelope.

3. A method according to claim 2, wherein said e-mail message further includes a stamp, said stamp being displayed on said screen at the upper right hand corner of said rectangular envelope such that said time stamp overlaps said stamp, and said method further comprises the step of:

causing, upon initiation of another user action when said cursor is positioned on said computer screen in another screen location corresponding to that of said stamp, said computer to connect with another location associated with said stamp.

4. A method according to claim 3, wherein said step of causing said computer to connect with said another location associated with said stamp uses another uniform resource locator to determine said location.

5. A method according to claim 1, wherein said e-mail message further includes textual content, said textual content being represented by an object on said envelope, and further comprising the step of causing, upon initiation of another user action when said cursor is positioned on said computer screen in another screen location corresponding to that of said object, said computer to display said textual content.

6. A method according to claim 5, wherein upon initiation of said another user action causing said computer to display said textual content, said another user action also causes the steps of:

generating an electronic response indicating said textual content has been displayed by said computer; and transmitting said generated electronic response.

7. A method according to claim 1, wherein each of said envelope front and said time stamp have an associated component identifier which said computer uses when rendering said envelope front and said time stamp.

8. A method according to claim 7, wherein each of said envelope front and said time stamp have associated component height data and component width data which said computer uses when rendering said envelope front and said time stamp.

9. A method according to claim 8, wherein each of said envelope front and said time stamp have associated vertical screen location data and horizontal screen location data which said computer uses when rendering said envelope front and said time stamp.

10. A method according to claim 8, where in said envelope time stamp has an associated sub-component identifier which said computer uses during said step of causing said computer to connect with said another location associated with said stamp.

11. A method according to claim 1, wherein said time stamp provides both a date and a time.

12. A method according to claim 11, wherein said time stamp is provided from a time stamp server.

13. A method of processing an e-mail message that includes a representation of an envelope containing a time stamp on a computer screen of a computer, said method comprising the steps of:

receiving, at said computer, said e-mail message that includes said representation of said envelope containing said time stamp;

rendering on said computer screen, using said computer, a representation of a front of said envelope;

rendering on said computer screen, using said computer, said time stamp at a screen location that is within the front of the envelope; and causing, upon initiation of a user action when a cursor is positioned on said computer screen at the screen location corresponding to that of said time stamp, said computer to connect with a location associated with said time stamp, wherein said step of causing is performed by execution of executable software that is received by said computer with said e-mail message.

14. A method according to claim 13, wherein said e-mail message further includes textual content, said textual content being represented by an object on said envelope, and further comprising the step of causing, upon initiation of another user action when said cursor is positioned on said computer screen in another screen location corresponding to that of said object, said computer to display said textual content.

15. A method according to claim 14, wherein upon initiation of said another user action causing said computer to display said textual content, said another user action also causes the steps of:
   generating an electronic response indicating said textual content has been displayed by said computer; and
   transmitting said generated electronic response.

16. A method according to claim 13, wherein each of said envelope front and said time stamp have an associated component identifier which said computer uses when rendering said envelope front and said time stamp.

17. A method according to claim 16, wherein each of said envelope front and said time stamp have associated component height data and component width data which said computer uses when rendering said envelope front and said time stamp.

18. A method according to claim 17, wherein each of said envelope front and said time stamp have associated vertical screen location data and horizontal screen location data which said computer uses when rendering said envelope front and said time stamp.

19. A method according to claim 13, wherein said time stamp provides both a date and a time.

20. A method according to claim 19, wherein said time stamp is provided from a time stamp server.

21. A method of processing an e-mail message that includes a representation of an envelope containing a time stamp on a computer screen of a computer, said method comprising the steps of:
   receiving, at said computer, said e-mail message that includes said representation of said envelope containing said time stamp;
   rendering on said computer screen, using said computer, a representation of a front of said envelope;
   rendering on said computer screen, using said computer, said time stamp at a screen location that is within the front of the envelope; and
   causing, upon initiation of a user action when a cursor is positioned on said computer screen at the screen location corresponding to that of said time stamp, said computer to connect with a location associated with said time stamp,
      wherein said e-mail message further includes another object, said object being displayed on said screen and said method further comprises the step of causing, upon initiation of another user action when said cursor is positioned on said computer screen in another screen location corresponding to that of said object, said computer to produce audio tones.

22. A method of processing an e-mail message that includes a representation of an envelope containing a time stamp on a computer screen of a computer, said method comprising the steps of:
   receiving, at said computer, said e-mail message that includes said representation of said envelope containing said time stamp;
   rendering on said computer screen, using said computer, a representation of a front of said envelope;
   rendering on said computer screen, using said computer, said time stamp at a screen location that is within the front of the envelope; and
   causing, upon initiation of a user action when a cursor is positioned on said computer screen at the screen location corresponding to that of said time stamp, said computer to connect with a location associated with said time stamp,
      wherein said e-mail message further includes another object, said object being displayed on said screen and said method further comprises the step of causing, upon initiation of another user action when said cursor is positioned on said computer screen in another screen location corresponding to that of said object, said computer to play a video.

23. A method of processing an e-mail message that includes a representation of an envelope containing a sender identity identification on a computer screen of a computer, said method comprising the steps of:
   receiving, at said computer, said e-mail message that includes said representation of said envelope containing said sender identity;
   rendering on said computer screen, using said computer, a representation of a front of said envelope;
   rendering on said computer screen, using said computer, said sender identity identification at a screen location that is within the front of the envelope; and
   causing, upon initiation of a user action when a cursor is positioned on said computer screen at the screen location corresponding to that of said sender identity identification, said computer to connect with a location associated with said sender identity identification, wherein a uniform resource locator is used to determine said location.

24. A method according to claim 23, wherein said step of rendering said envelope renders said envelope front so that it is rectangular in shape, said sender identity identification is located on the upper left hand corner of said rectangular envelope and said time stamp is located on the upper right hand corner of said rectangular envelope.

25. A method according to claim 23, wherein said sender identity is represented as one of a logo and an address.

26. A method of processing an e-mail message that includes a representation of an envelope containing a sender identity identification on a computer screen of a computer, said method comprising the steps of:
   receiving, at said computer, said e-mail message that includes said representation of said envelope containing said sender identity and a time stamp;
   rendering on said computer screen, using said computer, a representation of a front of said envelope;
   rendering on said computer screen, using said computer, said sender identity identification at a screen location that is within the front of the envelope;
   causing, upon initiation of a user action when a cursor is positioned on said computer screen at the screen location corresponding to that of said sender identity identification, said computer to connect with a location associated with said sender identity identification; and
   causing, upon initiation of another user action when said cursor is positioned on said computer screen in another screen location corresponding to that of said time stamp, said computer to connect with another location associated with said time stamp.

27. A method according to claim 26, wherein said step of causing said computer to connect with said another location associated with said time stamp uses another uniform resource locator to determine said location.

28. A method according to claim 26, wherein said e-mail message further includes a stamp, said stamp being displayed on said screen at the upper right hand corner of said rectangular envelope such that said time stamp overlaps said stamp and said method further comprises the step of:

causing, upon initiation of a further user action when said cursor is positioned on said computer screen in another screen location corresponding to that of said stamp, said computer to connect with another location associated with said stamp.

29. A method according to claim 26, wherein said step of rendering said envelope renders said envelope front so that it is rectangular in shape, said sender identity identification is located on the upper left hand corner of said rectangular envelope and said time stamp is located on the upper right hand corner of said rectangular envelope.

30. A method according to claim 26, wherein said sender identity is represented as one of a logo and an address.

31. A method of processing an e-mail message that includes a representation of an envelope containing a sender identity identification on a computer screen of a computer, said method comprising the steps of:

receiving, at said computer, said e-mail message that includes said representation of said envelope containing said sender identity and a request for a configured response, said request for said configured response being represented by an object on said envelope;

rendering on said computer screen, using said computer, a representation of a front of said envelope;

rendering on said computer screen, using said computer, said sender identity identification at a screen location that is within the front of the envelope;

causing, upon initiation of a user action when a cursor is positioned on said computer screen at the screen location corresponding to that of said sender identity identification, said computer to connect with a location associated with said sender identity identification; and causing, upon initiation of another user action when said cursor is positioned on said computer screen in another screen location corresponding to that of said object, said computer to display said request for configured response;

compiling of said configured response entered into said computer by said user; and transmitting said compiled configured response from said computer.

* * * * *